United States Patent
Borodin et al.

(10) Patent No.: US 10,514,989 B1
(45) Date of Patent: Dec. 24, 2019

(54) RECOVERY OF A VIRTUAL MACHINE WHILE RUNNING THE VIRTUAL MACHINE FROM A BACKUP ARCHIVE

(71) Applicant: Acronis International GmBh, Shaffhausen (CH)

(72) Inventors: Alexey Borodin, Moscow (RU); Vasily Semyonov, Moscow (RU); Stanislav Protasov, Moscow (RU); Serguei M. Beloussov, Costa Del Sol (SG); Maxim V. Lyadvinsky, Moscow (RU)

(73) Assignee: ACRONIS INTERNATIONAL GMBH (CH)

( * ) Notice: Subject to any disclaimer, the term of this patent is extended or adjusted under 35 U.S.C. 154(b) by 421 days.

(21) Appl. No.: 15/259,521

(22) Filed: Sep. 8, 2016

Related U.S. Application Data (60) Provisional application No. 62/216,617, filed on Sep. 10, 2015.

(51) Int. Cl.
*G06F 17/00* (2019.01)
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1464* (2013.01); *G06F 2009/45562* (2013.01); *G06F 2201/84* (2013.01)

(58) Field of Classification Search
CPC ............. G06F 11/1451; G06F 11/1469; G06F 11/1417; G06F 11/1464; G06F 11/1466
See application file for complete search history.

(56) References Cited

U.S. PATENT DOCUMENTS

| | | | |
|---|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |

(Continued)

*Primary Examiner* — Truong V Vo
(74) *Attorney, Agent, or Firm* — K&L Gates LLP (57) ABSTRACT

A method, computer program product, computing system, and system for recovering a virtual machine while running the virtual machine from a backup archive are described. The method may include emulating the virtual machine in preparation for finalizing the recovery of the virtual machine. The method may include creating a snapshot of the emulated virtual machine to redirect changes to the emulated virtual machine to a second delta file in the production datastore. The method may include cloning an original base virtual disk, including the first delta file, to the production datastore to create a cloned base virtual disk. The method may include patching a virtual disk file descriptor of the second delta file of the emulated virtual machine. The patching operation may include replacing links to the original base virtual disk of the emulated virtual machine, including the first delta file, with links to the cloned base virtual disk.

19 Claims, 3 Drawing Sheets

(56) References Cited

U.S. PATENT DOCUMENTS

| | | |
|---|---|---|
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 2006/0225065 A1 | 10/2006 | Chandhok et al. |
| 2010/0011178 A1 | 1/2010 | Feathergill |
| 2013/0262801 A1* | 10/2013 | Sancheti ............... G06F 3/065 711/162 |

* cited by examiner

RECOVERY OF A VIRTUAL MACHINE WHILE RUNNING THE VIRTUAL MACHINE FROM A BACKUP ARCHIVE

CROSS-REFERENCE TO RELATED APPLICATIONS

This application claims priority to and the benefit of U.S. Provisional Patent Application No. 62/216,617 filed on Sep. 10, 2015, the disclosure of which is herein incorporated by reference in its entirety.

TECHNICAL FIELD

The technical field may generally relate to cloud computing, and more particularly to recovery of virtual machines in a cloud environment.

BACKGROUND

Various business operations and services may be accomplished using computing platforms based on virtual machines. As a result, in the event of a virtual machine ("VM") failure, a recovery of the virtual machine may be initiated. The recovery of a VM from a backup archive may be time consuming, especially if there is a large amount of data that needs to be transferred from the backup archive to the final destination (e.g. a production datastore). This means that the services provided by the VM being recovered may be unavailable while the recovery is running if conventional methods are used.

The availability of the VM or its underlying applications/data during the recovery may be a business-critical feature. Replicas of the virtual machine may be used during failure/recovery in order to make the underlying applications/data available, however this may be costly and require additional hardware or storage. Other options for maintaining virtual machine availability during failure/recovery may only be temporary solutions or may be subject to slow performance. As such, there may be a need for more reliable availability of virtual machines during failure/recovery.

BRIEF SUMMARY

In an embodiment, a method for recovering a virtual machine while running the virtual machine from a backup archive may include emulating the virtual machine, which may include running the virtual machine to be recovered from the backup archive of the virtual machine, redirecting read requests from a virtual disk associated with the virtual machine to the backup archive associated with the virtual machine, and redirecting write requests to the virtual disk associated with the virtual machine to a first delta file in a production datastore. The method may also include finalizing the recovery of the virtual machine, which may include creating a snapshot of the emulated virtual machine to redirect changes to the emulated virtual machine to a second delta file in the production datastore, cloning an original base virtual disk of the emulated virtual machine, including the first delta file, to the production datastore to create a cloned base virtual disk, and patching a virtual disk file descriptor of the second delta file of the emulated virtual machine.

One or more of the following features may be included. The patching may include replacing links to the original base virtual disk of the emulated virtual machine, including the first delta file, with links to the cloned base virtual disk. The method may include removing the snapshot of the emulated virtual machine to merge the second delta file into the cloned base virtual disk. The method may also include removing the original base virtual disk of the emulated virtual machine, including the first delta file. The method may further include continuing running the virtual machine from the cloned base virtual disk in the production datastore and independent from the original base virtual disk of the emulated virtual machine. A backup agent may run on a virtual machine host or physical machine and may maintain operations with the backup archive from which the virtual machine may be emulated and may coordinate finalizing the recovery of the virtual machine.

In an embodiment, a computer program product may reside on a computer readable storage medium and may have a plurality of instructions stored on it. When executed by a processor, the instructions may cause the processor to perform operations for recovering a virtual machine while running the virtual machine from a backup archive. The operations may include emulating the virtual machine, which may include running the virtual machine to be recovered from the backup archive of the virtual machine, redirecting read requests from a virtual disk associated with the virtual machine to the backup archive associated with the virtual machine, and redirecting write requests to the virtual disk associated with the virtual machine to a first delta file in a production datastore. The operations may also include finalizing the recovery of the virtual machine, which may include creating a snapshot of the emulated virtual machine to redirect changes to the emulated virtual machine to a second delta file in the production datastore, cloning an original base virtual disk of the emulated virtual machine, including the first delta file, to the production datastore to create a cloned base virtual disk, and patching a virtual disk file descriptor of the second delta file of the emulated virtual machine.

One or more of the following features may be included. The patching operation may include replacing links to the original base virtual disk of the emulated virtual machine, including the first delta file, with links to the cloned base virtual disk. The operations may include removing the snapshot of the emulated virtual machine to merge the second delta file into the cloned base virtual disk. The operations may also include removing the original base virtual disk of the emulated virtual machine, including the first delta file. The operations may further include continuing running the virtual machine from the cloned base virtual disk in the production datastore and independent from the original base virtual disk of the emulated virtual machine. A backup agent may run on a virtual machine host or physical machine and may maintain operations with the backup archive from which the virtual machine may be emulated and may coordinate finalizing the recovery of the virtual machine.

In an embodiment a computing system for recovering a virtual machine while running the virtual machine from a backup archive may include one or more processors. The one or more processors may be configured to emulate the virtual machine, which may include running the virtual machine to be recovered from the backup archive of the virtual machine, redirecting read requests from a virtual disk associated with the virtual machine to the backup archive associated with the virtual machine, and redirecting write requests to the virtual disk associated with the virtual machine to a first delta file in a production datastore. The one or more processors may be further configured to finalize the recovery of the virtual machine, which may include creating a snapshot of the emulated virtual machine to redirect changes to the emulated virtual machine to a second delta file in the production datastore, cloning an original base virtual disk of the emulated virtual machine, including the first delta file, to the production datastore to create a cloned base virtual disk, and patching a virtual disk file descriptor of the second delta file of the emulated virtual machine.

One or more of the following features may be included. The patching may include replacing links to the original base virtual disk of the emulated virtual machine, including the first delta file, with links to the cloned base virtual disk. The one or more processors may be configured to remove the snapshot of the emulated virtual machine to merge the second delta file into the cloned base virtual disk. The one or more processors may be further configured to remove the original base virtual disk of the emulated virtual machine, including the first delta file. The one or more processors may also be further configured to continue running the virtual machine from the cloned base virtual disk in the production datastore and independent from the original base virtual disk of the emulated virtual machine. A backup agent may run on a virtual machine host or physical machine and may maintain operations with the backup archive from which the virtual machine may be emulated and may coordinate finalizing the recovery of the virtual machine.

In an embodiment, a system for recovering a virtual machine while running the virtual machine from a backup archive may include a backup agent running on a virtual machine host of a virtual machine to be recovered or running on a physical machine. The system may further include a backup archive from which the virtual machine may be emulated during recovery. The system may also include a first delta file in an production datastore to which write requests to a virtual disk associated with the virtual machine may be redirected. The system may additionally include a second delta file in the production datastore to which changes to the emulated virtual machine are redirected. Moreover, the system may include a cloned base virtual disk in the production datastore including underlying data from an original base virtual disk of the emulated virtual machine and the first delta file, and the cloned base virtual disk may be merged with the second delta file.

The details of one or more implementations are set forth in the accompanying drawings and the description below. Other features and advantages will become apparent from the description, the drawings, and the claims.

DETAILED DESCRIPTION

Overview

A cloud provider may institute backup and recovery procedures to ensure persistence of a tenant's applications, data, or other resources accessed through one or more virtual machines ("VM"). For example, a backup archive of the VM may be created and stored onsite or offsite and may include the entire content of the VM before it failed. Efficient recovery of VMs is critical for proper business operations of the cloud provider as the tenant's application demands are likely to continue in the event of a VM failure and recovery can take a long time. As such, availability of the VM during recovery may be a desirable feature.

In some situations, to save recovery time, the VM contents may be mounted from the backup archive and its contents may be emulated by accessing data right from the backup archive file. Mounting the VM contents from the backup archive may rely on a relatively slow NFS server which may be used to connect the backup archive to a cloud computing environment. Thus, the time before the VM services are once again available may be slower than when the VM is not mounted through the backup archive. Further, mounting the VM contents from the backup archive may only be a temporary solution because the VM may still need to be fully restored to its virtual disk so its contents can persist or live for a long time.

Also, in some situations, a replica VM may be created and powered on or booted up in case of a disaster or failure in order to bring VM services back online. Replication may impose additional storage requirements because the original VM (production VM) may still need to be maintained. Allocating the same space and resources (e.g., hardware, equipment) for the replica VM may double the requirements for storage space.

In view of the forgoing, there may be a need for a system that enables availability of the services provided by a VM that failed, during recovery of the failed VM, and to provide faster recovery as recovery time may be critical for proper business operations. The techniques and features described herein may reduce the time of a VM recovery (i.e., until services of the restored VM become operational) to a production datastore from the backup archive as compared with standard data copying (e.g., from backup archive to final destination). The time reduction may be achieved by running and emulating the VM from a backup archive and performing a finalization in the background, while the VM keeps running and providing application services.

The recovery time is critical for proper business operations. In various implementations, the techniques and features described in the present disclosure are directed towards systems and methods for recovering a virtual machine while running and emulating the virtual machine from a backup archive, which may enable availability of the services provided by a VM that failed during recovery of the failed VM.

Figure 1:
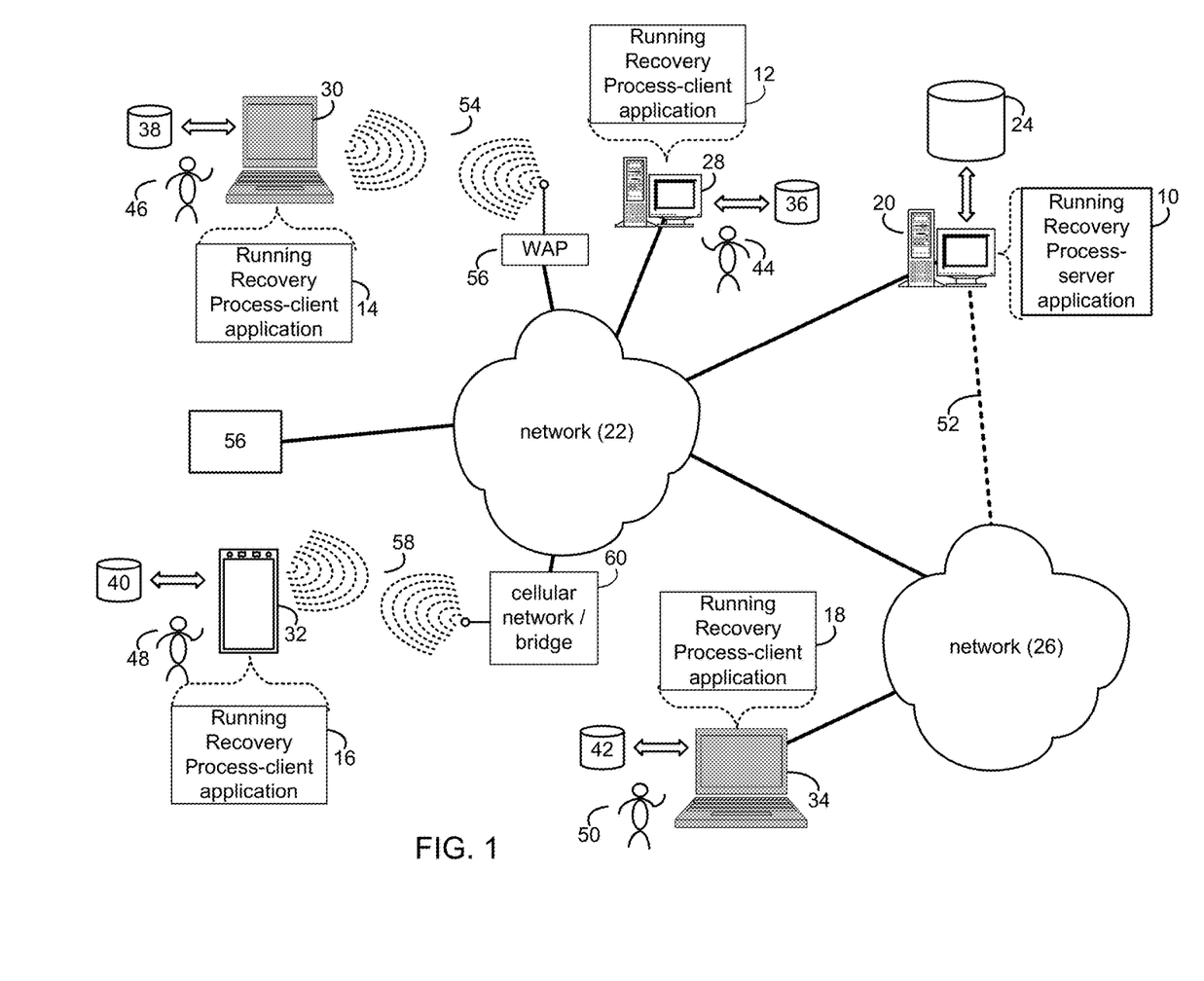
FIG. 1 depicts an example system that can execute implementations of the present disclosure.
Figure 2:
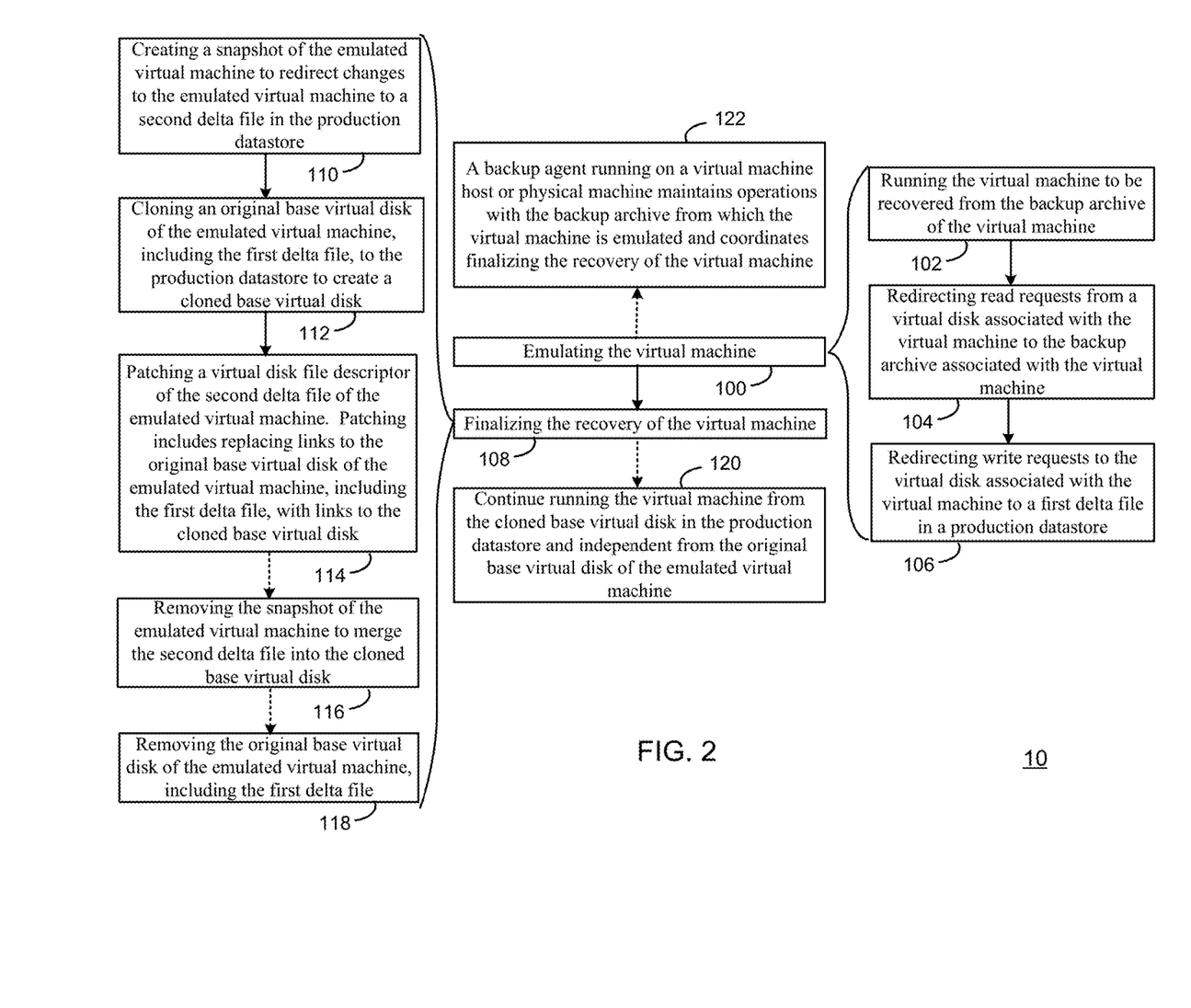
FIG. 2 is a flowchart illustrating an example process for recovering a virtual machine while running the virtual machine from a backup archive in accordance with the present disclosure.

Referring to FIGS. 1 & 2, there is shown a server application 10 and client applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as running recovery process 10. Further, one or more of client applications 12, 14, 16, and 18 may be referred to as a process configured to carry out one or more of the features described herein, such as running recovery processes 12, 14, 16, and/or 18.

As will be discussed below, running recovery process 10 may emulate 100 a virtual machine by carrying out one or more of the following operations or steps. Running recovery process 10 may run 102 the virtual machine to be recovered from the backup archive of the virtual machine. Further, running recovery process 10 may redirect 104 read requests from a virtual disk associated with the virtual machine to the backup archive associated with the virtual machine. Running recovery process 10 may additionally redirect 106 write requests to the virtual disk associated with the virtual machine to a first delta file in a production datastore. Moreover, running recovery process 10 may finalize 108 the recovery of the virtual machine by carrying out one or more of the following operations or steps. Running recovery process 10 may create 110 a snapshot of the emulated virtual machine to redirect changes to the emulated virtual machine to a second delta file in a production datastore. Running recovery process 10 may further clone 112 an original base virtual disk of the emulated virtual machine, including the first delta file, to the production datastore to create a cloned base virtual disk. Running recovery process 10 may additionally patch 114 a virtual disk file descriptor of the second delta file of the emulated virtual machine.

The running recovery process may be a server-side process (e.g., server-side running recovery process 10), a client-side process (e.g., client-side running recovery process 12, client-side running recovery process 14, client-side running recovery process 16, or client-side running recovery process 18), or a hybrid server-side/client-side process (e.g., a combination of server-side running recovery process 10 and one or more of client-side running recovery processes 12, 14, 16, 18).

System Overview

Referring to FIG. 1, server-side running recovery process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side running recovery process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side running recovery processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side running recovery processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side running recovery processes 12, 14, 16, 18 and/or server-side running recovery process 10 may be processes that run within (i.e., are part of) a cloud computing site, cloud computing application, cloud platform, or cloud environment. Alternatively, client-side running recovery processes 12, 14, 16, 18 and/or server-side running recovery process 10 may be stand-alone applications that work in conjunction with the cloud computing site, cloud computing application, cloud platform, or cloud environment. One or more of client-side running recovery processes 12, 14, 16, 18 and server-side running recovery process 10 may interface with each other (via network 22 and/or network 26).

Users 44, 46, 48, 50 may access server-side running recovery process 10 directly through the device on which the client-side running recovery process (e.g., client-side running recovery processes 12, 14, 16, 18) is executed, namely client electronic devices 28, 30, 32, 34, for example. Users 44, 46, 48, 50 may access server-side running recovery process 10 directly through network 22 and/or through secondary network 26. Further, server computer 20 (i.e., the computer that executes server-side running recovery process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK)

modulation, for example. Bluetooth is a telecommunications industry specification that allows e.g., mobile phones, computers, and personal digital assistants to be interconnected using a short-range wireless connection.

Running Recovery Process

For the following discussion, server-side running recovery process 10 will be described for illustrative purposes and server computer 20 may serve as a representation of a cloud computing site and referred to as cloud computing site 20 which includes multiple server computers (e.g., a virtual machine host computer). It should be noted that server-side running recovery process 10 may interact with client-side running recovery process 12 and may be executed within one or more applications that allow for communication with client-side running recovery process 12. However, this is not intended to be a limitation of this disclosure, as other configurations are possible (e.g., stand-alone, client-side running recovery processes and/or stand-alone server-side running recovery processes). For example, some implementations may include one or more of client-side running recovery processes 12, 14, 16, 18 in place of or in addition to server-side running recovery process 10.

The systems and methods (e.g., running recovery process 10) described herein may relate to the recovery of data in a virtualized environment. In part, the systems and methods may relate to decreasing the recovery time period for restoring a virtual machine and, more specifically, retaining availability of the virtual machine (VM) while it is being restored. The techniques and features described herein may reduce the recovery time period for the VM or decrease or eliminate the time during which services supported by the VM are unavailable during a VM failure when compared to transferring all the VM data from the backup archive back to the VM virtual disk for restoration during a conventional recovery process.

The systems described herein may include one or more memory elements for backup of software and databases, virtual machines, and computer storage products including instructions to be executed by a processor to cause the processor to implement the methods described herein. The systems described herein may also include a backup archive, where the VM backup file or backup contents may be located; the backup archive may be disposed in a memory, a portion of a memory, or across one or more memories.

Referring now to FIG. 1, one or more of users 44, 46, 48, and 50 may be cloud administrators at a cloud provider or may be cloud end-users. The cloud administrators may access and administer cloud computing site 20 and the cloud-end users may access and interact with cloud computing site 20 through one or more of client electronic devices 28, 30, 32, 34 (respectively). Cloud computing site 20 may run a cloud or virtualization application such as VMWare™ or may include bare-metal embedded hypervisors (e.g., VMware™ ESX™ and VMware™ ESXi™) that may run directly on server hardware at cloud computing site 20. Further, cloud computing site 20 may include a vCloud™ architecture that may enhance cooperation between hypervisors. Running recovery process 10 may run at cloud computing site 20 and may include any number of the techniques or features described herein.

Figure 3:
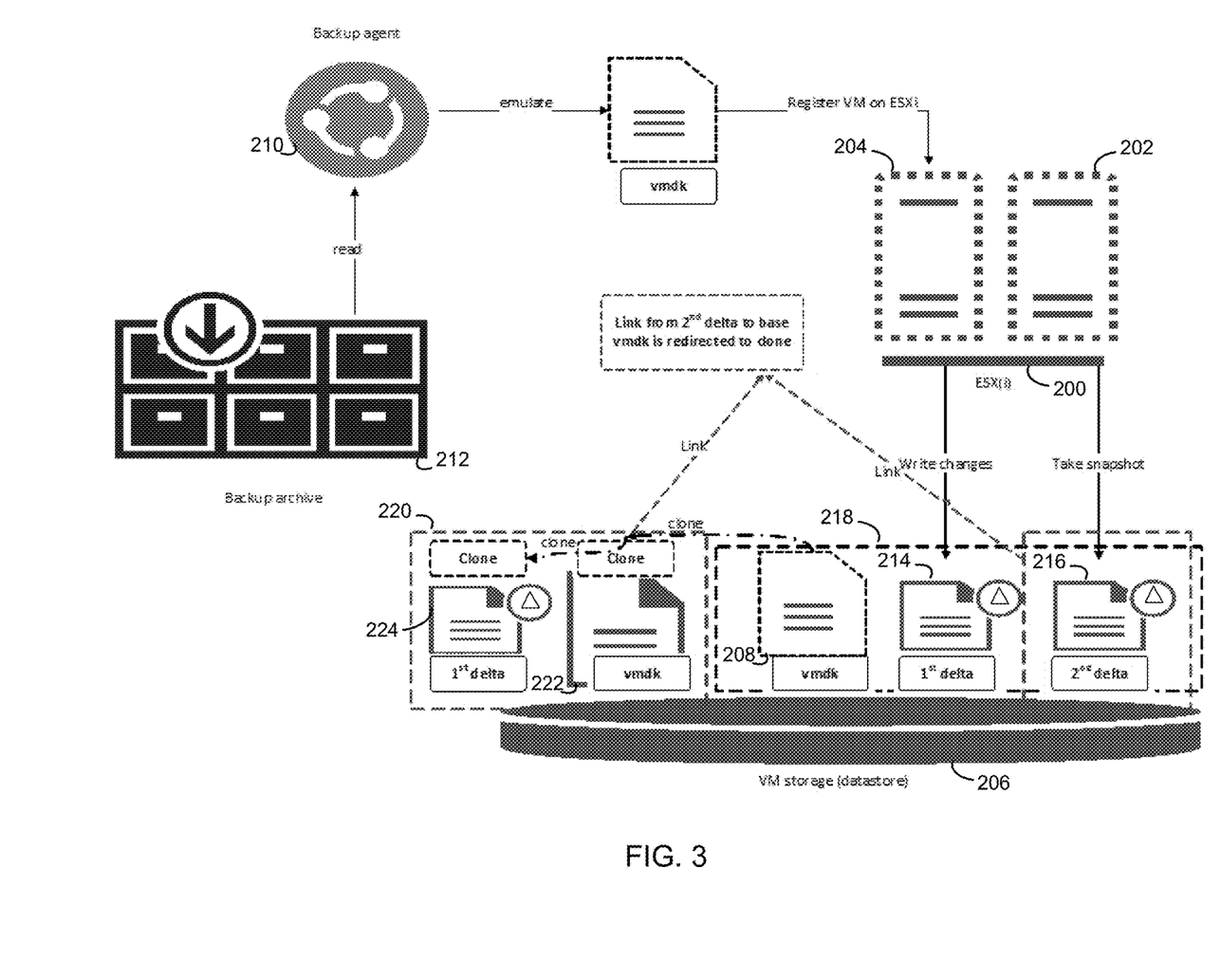
FIG. 3 depicts an example illustration of recovering a virtual machine while running the virtual machine from a backup archive in accordance with the present disclosure.

Referring now to FIGS. 1 & 3, cloud computing site 20 may include one or more host machines such as host 200 (e.g., a virtual machine host computer). Host 200 may be a server computer on which a hypervisor runs one or more virtual machines (e.g., VM 202). Host 200 may be an ESXi host and may run the VMware™ ESXi™ hypervisor. Host 200 may use a cluster file system such as Virtual Machine File System (VMFS) or a Network File System (NFS).

For example, host 200 may access a datastore 206, which may be based on VMFS. Datastore 206 may include one or more virtual disks, which may be virtual machine disk (VMDK or .vmdk) files. The virtual disk may be a single disk file or one or more disk files including the constituent data and/or descriptors for an entire virtual machine (e.g., virtual machine 202). Datastore 206 may be a file system data store or production datastore and illustratively in FIG. 3 may be a logical representation of the storage provided by host 200 and may reside inside or outside host 200.

Host 200 may also include or be in communication with backup agent 210. Backup agent 210 may include a software component, executable code, function, subroutine, or other set of instructions designed to carry out one or more operations for recovery of one or more virtual machines running on host 200. Backup agent 210 may run on host 200 or a separate physical machine. Backup archive 212 may reside on a physical or virtual storage device and may be created by backup agent 210.

Backup agent 210 may coordinate the running recovery process. Backup agent 210 may include instructions designed to carry out one or more of the techniques and features described herein and may be installed on an ESX(i) host. For example, host 200 may be a source pre-configured ESX(i) host which may host one or more VMs which need to be restored. In an embodiment, backup agent 210 may include executable code configured to work with an emulated VM and provide access to the backup archive 212 from which the underlying VM data is restored. Moreover, in an embodiment, backup agent 210 may create a backup of a VM that ultimately needs to be recovered. Backup agent 210 may maintain (122) operations associated with backup archive 212 from which the VM to be restored may run while being recovered, as described below. Further, backup agent 210 may coordinate (122) a "finalization" process for the VM being restored. "Finalization" may be used to describe the process of making the restored VM a permanent VM which is reliable and accessible by users just as the original VM was prior to failure. For example, as described below, finalization may include replacing subchain links in one or more .VMDK descriptor files to correspond to links in a cloned base virtual disk. These replaced links may then reference the cloned base virtual disk.

Backup archive 212 may be created in advance from a VM which may later need to be restored. Further, backup archive 212 may be created by reading a VM virtual disk through an application programming interface (API) such as VMware™ vStorage™ API. Backup archive 212 may include the contents of the underlying volumes of the VM which may later need to be restored.

In an implementation, backup archive 212 may be created routinely by a system administrator either manually or on an automated schedule for each VM hosted by host 200. There may be multiple versions of backup archive 212 that may correspond to different points-in-time for each VM, which may be referred to as recovery points. Backup archive 212 may also be created by backup agent 210, by running recovery process 10, or by a combination of both, as directed by the system administrator. The techniques and features described herein may be performed by backup agent 210, by running recovery process 10, or by a combination of both.

For example, backup agent 210 may include the instruction sets and subroutines of server-side running recovery process 10 (or in some implementations, one or more of the client-side running recovery processes described above) or may include other software components, executable code, functions, or subroutines required to carry out the techniques and features described herein. Backup agent 210 may be installed on host 200 or a separate physical machine.

Running recovery 10 process may be initiated upon failure of a virtual machine (VM). Referring now also to FIG. 2, running recovery process 10 (via, e.g., backup agent 210) may emulate 100 the VM to be recovered (e.g., VM 202). Running recovery process 10 may emulate the VM on host 200 from backup archive 212. During emulation, the VM may appear up and running. For example, running recovery process 10 may register the VM for emulation on host 200 using backup archive 212, which may include data from a .vmdk file of the VM at the time the backup archive was created. Emulation of the VM to be recovered may include one or more of the following operations or steps.

Running recovery process 10 may run 102 the virtual machine to be recovered from the backup archive (e.g, backup archive 212) of the virtual machine. As shown in FIG. 3, for illustrative purposes only, the VM to be recovered may be VM 202. VM 202 may have failed, and may subsequently be registered from backup archive 212 onto host 200 during recovery.

During emulation, running recovery process 10 may redirect 104 read requests from a virtual disk associated with the virtual machine (e.g., VM 202) to the backup archive (e.g., backup archive 212) associated with the virtual machine. In an embodiment, backup agent 210 may coordinate handling of the read requests such that the requested data is read from backup archive 212. As a result, all read requests to the virtual disk of VM 202 (which is emulated) may be redirected to backup archive 212. In this situation, the read requests may not be performed via the datastore 206, as they normally would be, but may be performed directly from backup archive 212.

Further, running recovery process 10 may redirect 106 write requests to the virtual disk associated with the virtual machine (i.e., the virtual machine being recovered, such as VM 202) to a first delta file in a production datastore (e.g., datastore 206). For example, running recovery process 10 may redirect 106 write requests to the virtual disk of VM 202 to delta file 214. In other words, any changes to VM 202 during recovery may be written to the first delta file (e.g., delta file 214).

During the running recovery process described herein, backup archive 212 of VM 202 may be mounted such that data can be read directly from backup archive 212 and emulation can be performed. To complete the recovery, running recovery process 10 may perform finalization of the recovery of the emulated VM such that reading is performed not from backup archive 212, but from datastore 206, where the VM will ultimately be fully recovered. Thus, running recovery process 10 may finalize 108 the recovery of the VM (e.g., VM 202).

For example, running recovery process 10 may create 110 a snapshot of the emulated virtual machine to redirect changes to the emulated virtual machine to a second delta file (e.g., delta file 216) in the production datastore (e.g., datastore 206). In an embodiment, running recovery process 10 may use a VMware ESXi host API to create the snapshot of the emulated VM. As a result, all changes made to the emulated VM may be redirected into a separate second delta file (e.g., delta file 216) created on production datastore (e.g., datastore 206).

It should be noted that prior to creation of the snapshot of the emulated VM, the emulated VM saved changes into the first delta file (e.g., delta file 214), which may have been created automatically as part of the operation to run/emulate the VM from the backup archive (e.g., backup archive 212). As discussed above, VM read requests were thus made directly from backup archive 212 and VM write requests were redirected to the first delta file (e.g., delta file 214). After creation of the snapshot of the emulated VM, changes to the VM are redirected to the second delta file (e.g., delta file 216). As a result, the first delta file (e.g., delta file 214) and the base virtual disk (e.g., virtual disk 208) remain unchanged after the snapshot of the emulated VM is created.

Running recovery process 10 may continue to finalize recovery of VM 202 by cloning 112 an original base virtual disk of the emulated virtual machine, including the first delta file, to the production datastore to create a cloned base virtual disk. For example, running recovery process 10 may clone 112 virtual disk 208, including delta file 214, to datastore 206 to create cloned base virtual disk 220. In an embodment, running recovery process 10 may call a disk clone method from a VMware ESXi host API to clone the disks of the emulated VM. As a result, the data from the emulated virtual disk (e.g., base virtual disk 208 and delta file 214) may be copied over to the production datastore (e.g., datastore 206), which may be permanent storage. Because the changes made to the emulated VM are already being saved to the second delta file (e.g., delta file 216) in the production datastore (e.g., data store 206), the base virtual disk (e.g., virtual disk 208) and the first delta file (e.g., delta file 214), which are read from the backup archive 212, have not changed and can be copied "as is" in the cloning operation.

After the cloning operation 112 there may be two copies of the virtual disk. The first copy may be the original emulated virtual machine disk (e.g., emulated VM disk 218). The second copy may be the cloned virtual disk (e.g., cloned virtual disk 220), which may include copies of the base virtual disk 208 and the first delta file (e.g., delta file 214). The copies may be, for example, base virtual disk copy 222 and first delta file copy 224.

Running recovery process 10 may continue to finalize recovery of VM 202 by patching 114 a virtual disk file descriptor of the second delta file (e.g., delta file 216) of the emulated virtual machine. Further, the patching operation 114 may include replacing links to the original base virtual disk (e.g., emulated VM disk 218) of the emulated virtual machine, including the first delta fine, with links to the cloned base virtual disk (e.g., cloned base virtual disk 220), as discussed further below. In an embodiment, each virtual disk or virtual disk delta file may include two .VMDK files on the production datastore (e.g., datastore 206). One of these .VMDK files may be a descriptor file, which may be small in size. The other of these .VMDK files may include the actual virtual disk data.

For example, and for illustrative purposes only, there is shown below a base virtual disk (i.e., shown as W2K8R2-000002) and its delta file (i.e., shown as W2K8R2-000001):
W2K8R2-000001-delta.vmdk   12-Sep-2014   23:10 2281787392
W2K8R2-000001-vmdk 28-Jan-2015 08:35 345
W2K8R2-000002-flat.vmdk   13-Aug-2014   16:74 42949672960
W2K8R2-000002.vmdk 01-Aug-2015 17:49 523

As shown above, the base virtual disk W2K8R2-000002 (e.g., base virtual disk 208) may include the file "W2K8R2-000002-flat.vmdk" which may be the parent file and include the actual virtual disk data and the file "W2K8R2-000002.vmdk" which may be the descriptor file. Further, the virtual disk delta file W2K8R2-000001 (e.g., delta file 216)

may include the files "W2K8R2-000001-delta.vmdk" and "W2K8R2-000001.vmdk". An example of sublink chains in the .VMDK descriptor file of the delta file (e.g., delta file 216) is shown below, for illustrative purposes only:
Disk DescriptorFile
version=1
encoding="UTF-8"
CID=af381c75
parentCID=cca94b77
isNativeSnapshot="no"
createType="vmfsSparse"
parentFileNameHint="W2K8R2-000002.vmdk"
Extent description
RW 83886080 VMFSSPARSE "W2K8R2-000001-delta.vmdk"
The Disk Data Base
DDB
ddb.deletable="true"
ddb.longContentID="127cd73e890f09fdb0220c8aaf381c75"

As shown above, the parentFileNameHint entry may include the name of the base virtual disk (i.e., W2K8R2-000002.vmdk) with which the delta disk (W2K8R2-000001-delta.vmdk) is linked. In an embodiment, the entry parentCID entry may include an ID (i.e., "cca94b77") of the base virtual disk, as shown above. Below, there is shown for illustrative purposes only an example of a base virtual disk .VMDK descriptor file:
Disk DescriptorFile
version=1
encoding="UTF-8"
CID=cca94b77
parentCID=ffffffff
isNativeSnapshot="no"
createType="vmfs"
Extent description
RW 83886080 VMFS "W2K8R2-000002-flat.vmdk"
The Disk Data Base
DDB
ddb.adapterType="lsilogic"
ddb.deletable="true"
ddb.geometry.cylinders="5221"
ddb.geometry.heads="255"
ddb.geometry.sectors="63"
ddb.longContentID="de6b54fd8ab28e618ecf619bcca94b77"
ddb.toolsVersion="9349"
ddb.uuid="60 00 C2 95 43 50 a3 69-5a 88 5c d6 a8 ed f7 d6"
ddb.virtualHWVersion="8"

Using the techniques and features described herein, running recovery process 10 may replace parentCID and parentFileNameHint values in the delta file .vmdk descriptor such as those shown above with values which correspond to the link in the cloned base virtual disk. For example, in an embodiment, the parentCID value may become "ffffffff", which may indicate that this .vmdk file describes a base virtual disk and is the first one in the disk subchain.

Further, running recovery process 10 may remove 116 the snapshot of the emulated virtual machine to merge the second delta file (e.g., delta file 216) into the cloned base virtual disk (e.g., cloned base virtual disk 220). Merging of the second delta file may be performed automatically as part of the snapshot removal process. For example, snapshot removal in some systems may automatically result in the snapshot deltas files being merged into the base virtual disk. In an embodiment, the VM may continue to run while the snapshot is being removed and the second delta file is merged. Further, running recovery process 10 may remove 118 the original base virtual disk of the emulated virtual machine, including the first delta file. The entire emulated VM disk 218 may be removed as it is no longer referenced by the second delta file (e.g., delta file 216) and the VM runs fully from the cloned base virtual disk (e.g., cloned base virtual disk 220).

As a result, the virtual machine may continue running 120 from the cloned base virtual disk (e.g., cloned base virtual disk 220) in the production datastore (e.g., datastore 206) and independent from the original base virtual disk (e.g., emulated VM disk 218) of the emulated virtual machine. It is no longer necessary for backup agent 210 to emulate the virtual disk as the VM is independent from the emulated virtual disk and the backup agent. Thus, using the techniques and features described herein, a failed VM being recovered may become available almost instantly from a recovered virtual machine power on event, and the VM may be available while the recovery and finalization process is performed in the background.

Example Software and Hardware Related Implementations

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for recovering a virtual machine while running the virtual machine from a backup archive, the method comprising:
   emulating the virtual machine by:
   running the virtual machine to be recovered from the backup archive of the virtual machine;
   redirecting read requests from a virtual disk associated with the virtual machine to the backup archive associated with the virtual machine; and
   redirecting write requests to the virtual disk associated with the virtual machine to a first delta file in a production datastore; and
   finalizing the recovery of the virtual machine by:
   creating a snapshot of the emulated virtual machine to redirect changes to the emulated virtual machine to a second delta file in the production datastore;
   cloning an original base virtual disk of the emulated virtual machine, including the first delta file, to the production datastore to create a cloned base virtual disk; and
   patching a virtual disk file descriptor of the second delta file of the emulated virtual machine.

2. The method of claim 1, wherein the patching comprises:
   replacing links to the original base virtual disk of the emulated virtual machine, including the first delta file, with links to the cloned base virtual disk.

3. The method of claim 1, further comprising:
   removing the snapshot of the emulated virtual machine to merge the second delta file into the cloned base virtual disk.

4. The method of claim 1, further comprising:
   removing the original base virtual disk of the emulated virtual machine, including the first delta file.

5. The method of claim 1, further comprising:
   continuing running the virtual machine from the cloned base virtual disk in the production datastore and independent from the original base virtual disk of the emulated virtual machine.

6. The method of claim 1, wherein a backup agent running on a virtual machine host or physical machine maintains operations with the backup archive from which the virtual machine is emulated and coordinates finalizing the recovery of the virtual machine.

7. A computer program product residing on a computer readable storage medium having a plurality of instructions stored thereon, which, when executed by a processor, cause the processor to perform operations for recovering a virtual machine while running the virtual machine from a backup archive, the operations comprising:
   emulating the virtual machine by:
   running the virtual machine to be recovered from the backup archive of the virtual machine;
   redirecting read requests from a virtual disk associated with the virtual machine to the backup archive associated with the virtual machine; and
   redirecting write requests to the virtual disk associated with the virtual machine to a first delta file in a production datastore; and
   finalizing the recovery of the virtual machine by:
   creating a snapshot of the emulated virtual machine to redirect changes to the emulated virtual machine to a second delta file in the production datastore;
   cloning an original base virtual disk of the emulated virtual machine, including the first delta file, to the production datastore to create a cloned base virtual disk; and
   patching a virtual disk file descriptor of the second delta file of the emulated virtual machine.

8. The computer program product of claim 7, wherein the patching operation comprises:
   replacing links to the original base virtual disk of the emulated virtual machine, including the first delta file, with links to the cloned base virtual disk.

9. The computer program product of claim 7, wherein the operations further comprise:
   removing the snapshot of the emulated virtual machine to merge the second delta file into the cloned base virtual disk.

10. The computer program product of claim 7, wherein the operations further comprise:
    removing the original base virtual disk of the emulated virtual machine, including the first delta file.

11. The computer program product of claim 7, wherein the operations further comprise:
    continuing running the virtual machine from the cloned base virtual disk in the production datastore and independent from the original base virtual disk of the emulated virtual machine.

12. The computer program product of claim 7, wherein a backup agent running on a virtual machine host or physical machine maintains operations with the backup archive from which the virtual machine is emulated and coordinates finalizing the recovery of the virtual machine.

13. A computing system for recovering a virtual machine while running the virtual machine from a backup archive, the computing system comprising one or more processors, wherein the one or more processors are configured to:
    emulate the virtual machine by:
    running the virtual machine to be recovered from the backup archive of the virtual machine;
    redirecting read requests from a virtual disk associated with the virtual machine to the backup archive associated with the virtual machine; and
    redirecting write requests to the virtual disk associated with the virtual machine to a first delta file in a production datastore; and
    finalize the recovery of the virtual machine by:
    creating a snapshot of the emulated virtual machine to redirect changes to the emulated virtual machine to a second delta file in the production datastore;
    cloning an original base virtual disk of the emulated virtual machine, including the first delta file, to the production datastore to create a cloned base virtual disk; and
    patching a virtual disk file descriptor of the second delta file of the emulated virtual machine.

14. The computing system of claim 13, wherein the patching comprises:
    replacing links to the original base virtual disk of the emulated virtual machine, including the first delta file, with links to the cloned base virtual disk.

15. The computing system of claim 13, wherein the one or more processors are further configured to:
    remove the snapshot of the emulated virtual machine to merge the second delta file into the cloned base virtual disk.

16. The computing system of claim 13, wherein the one or more processors are further configured to:
    remove the original base virtual disk of the emulated virtual machine, including the first delta file.

17. The computing system of claim 13, wherein the one or more processors are further configured to:
  continuing running the virtual machine from the cloned base virtual disk in the production datastore and independent from the original base virtual disk of the emulated virtual machine.

18. The computing system of claim 13, wherein a backup agent running on a virtual machine host or physical machine maintains operations with the backup archive from which the virtual machine is emulated and coordinates finalizing the recovery of the virtual machine.

19. A system for recovering a virtual machine while running the virtual machine from a backup archive, the system comprising:
  a backup agent running on a virtual machine host of a virtual machine to be recovered or running on a physical machine;
  a backup archive from which the virtual machine is emulated during recovery;
  a first delta file in an production datastore to which write requests to a virtual disk associated with the virtual machine are redirected;
  a second delta file in the production datastore to which changes to the emulated virtual machine are redirected; and
  a cloned base virtual disk in the production datastore including underlying data from an original base virtual disk of the emulated virtual machine and the first delta file, the cloned base virtual disk merged with the second delta file.

* * * * *